Dec. 15, 1970  E. M. KOOS ET AL  3,546,791
EDUCATIONAL TELEVISION SYSTEM
Filed June 20, 1968  4 Sheets-Sheet 1
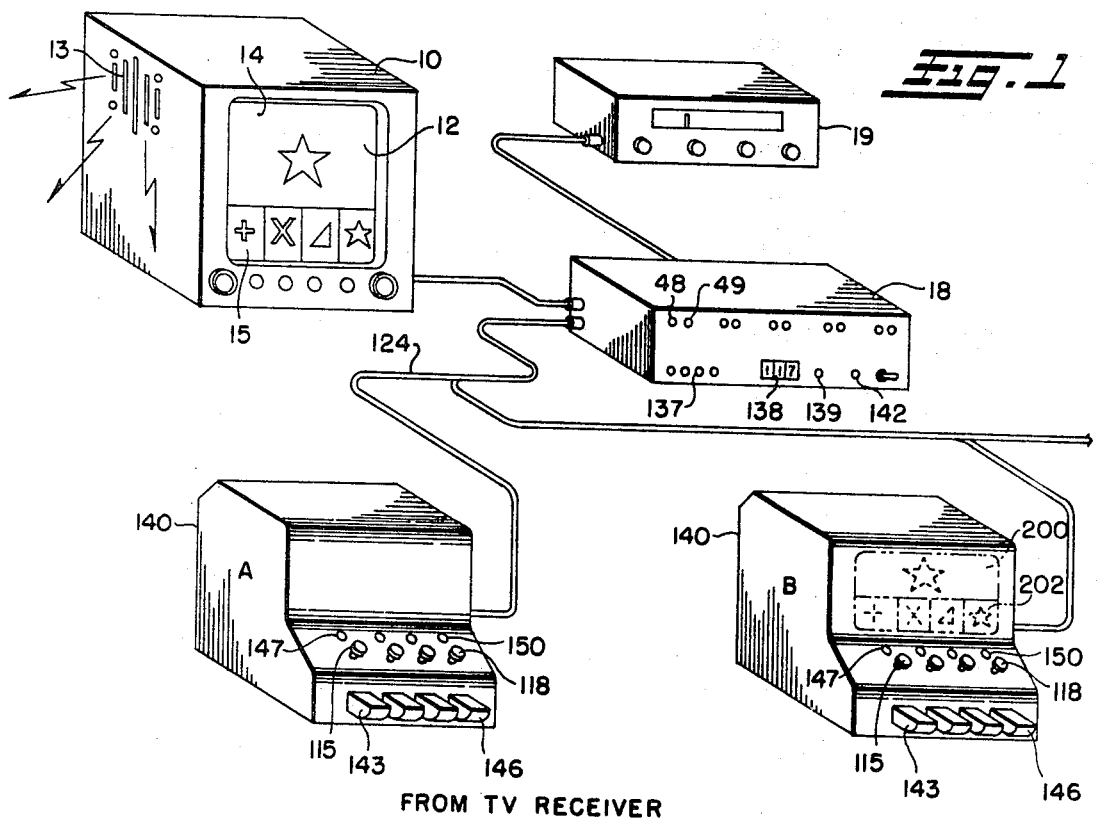
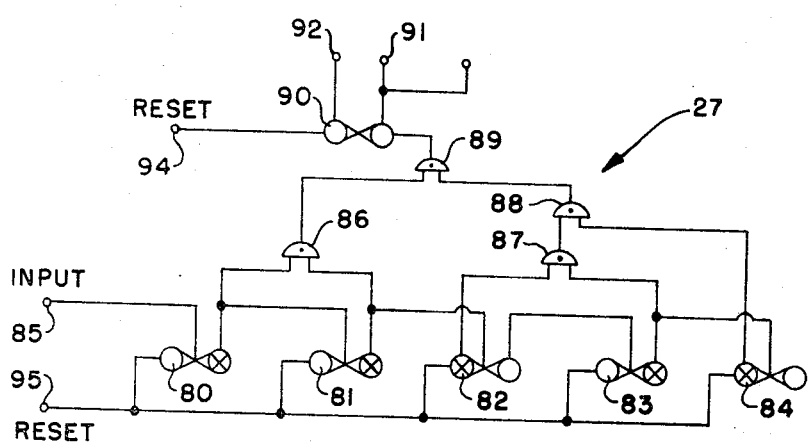
INVENTORS
EUGENIA M. KOOS
JOSEPH B. BALAZS
BY
Oberlin, Maky, Donnelly & Renner
ATTORNEYS

INVENTORS
EUGENIA M. KOOS
JOSEPH B. BALAZS

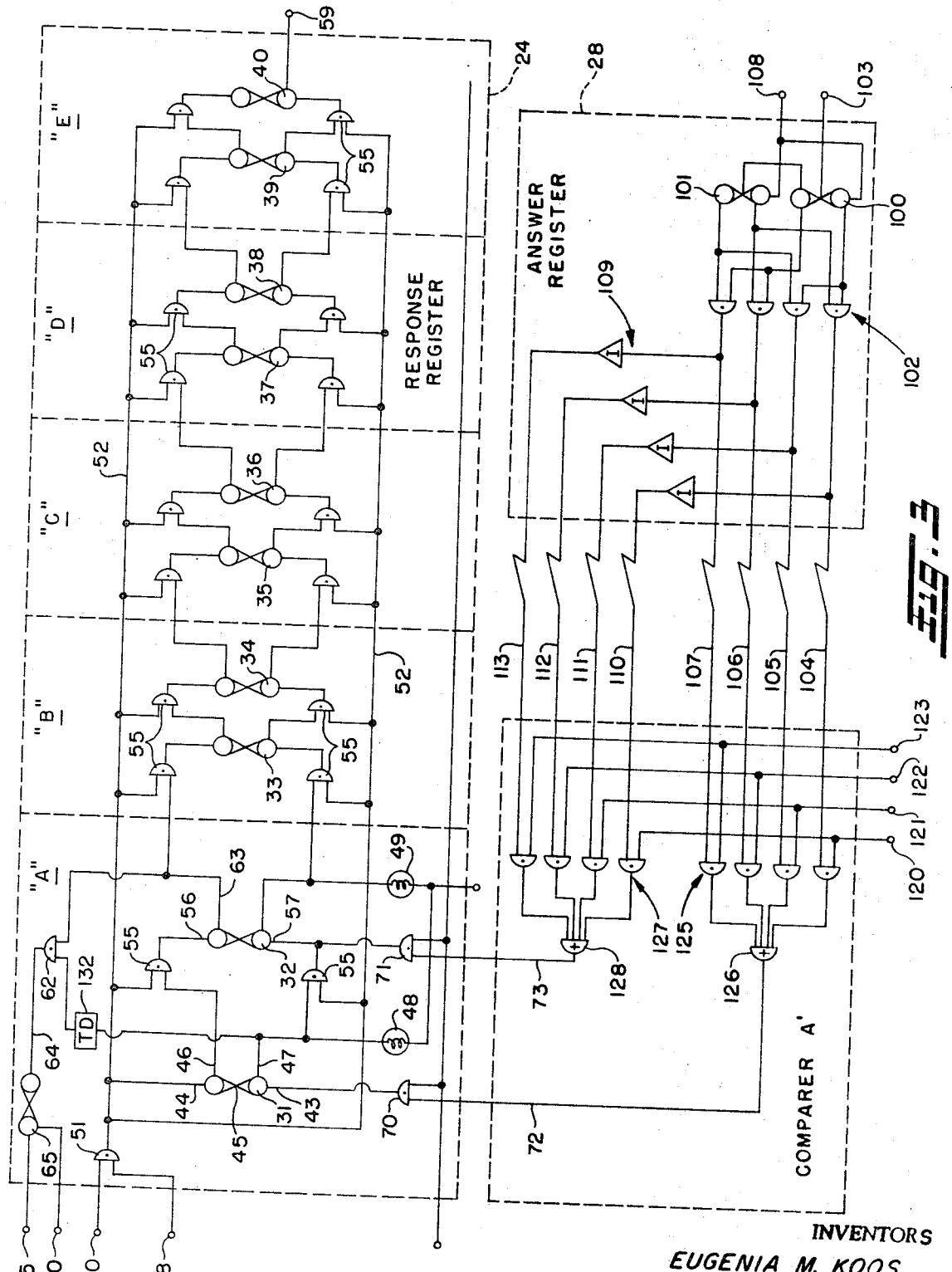

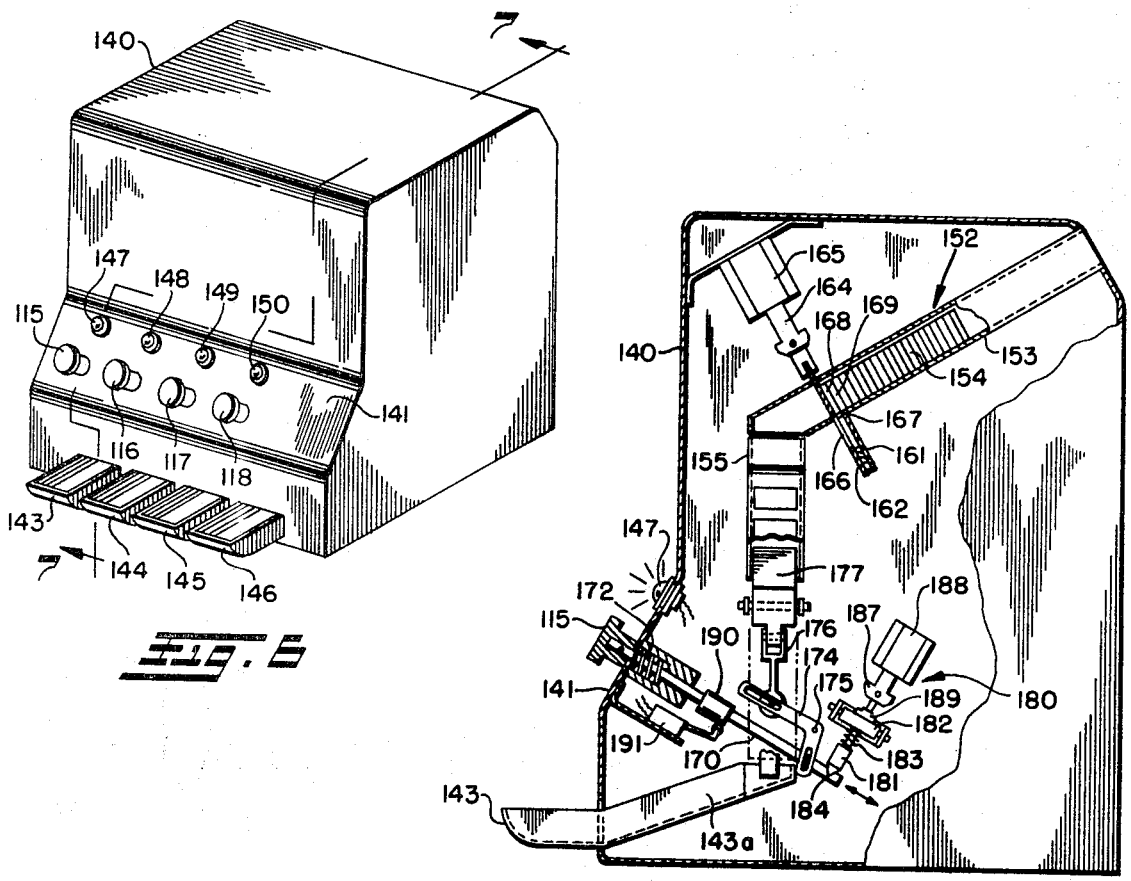
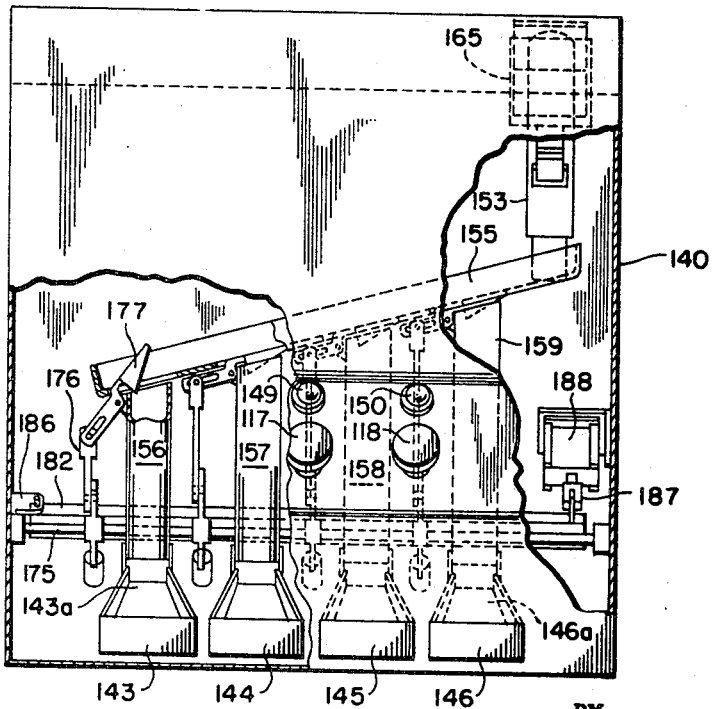

ent Office 3,546,791
Patented Dec. 15, 1970

3,546,791
EDUCATIONAL TELEVISION SYSTEM
Eugenia M. Koos, 4907 Neosho, Mission, Kans.
66205, and Joseph B. Balazs, Shaker Heights,
Ohio; said Balazs assignor to said Koos
Filed June 20, 1968, Ser. No. 738,494
Int. Cl. G09b 7/06
U.S. Cl. 35—9   15 Claims

ABSTRACT OF THE DISCLOSURE

Electronic teaching or testing apparatus having a reward system inherent therein, and being cooperable with a television set for receiving instructions from a remote source and for providing a visual display of a question program. Answers supplied with the received signals and individual student responses are compared and registered and the results are transmitted to the remote source for tabulation and analysis. A token dispensing mechanism is actuated by a student's correct response to provide a motivational reward. An instructor's console is included in the system for continuously monitoring the responses or for generating and controlling a local program.

---

This invention relates to educational systems and more particularly to a television type teaching system wherein widespread simultaneous teaching or testing may be accomplished from a central source.

Teaching devices of this type have received widespread interest recently as a means for effectively educating a large group of individuals with a minimum of supervision. Recently, television apparatus has been employed in this regard since it has now become commonplace for many of the primary schools to employ this apparatus as standard equipment, usually in the individual classrooms. It is well known that evaluation of individuals is difficult when performed on a small sample basis, this being a particular classroom or age level within a certain area, due primarily to the fact that such small sample of students will usually have a similar environmental background and are exposed to an individual instructor who may bias their responses in particular areas. Also, it is quite difficult to correlate the teaching procedures at various schools within a system in order to test students at the same time or to effectively evaluate their responses. Further, the students are exposed to various controls at the individual locations and the same testing conditions may not obtain, for example, the time provided for response to a particular question may be varied to some extent by the instructor in charge of the group. In the past, student responses have been gathered in small groups for accumulation at a later date and for evaluation of the results. It would be preferable to provide a system whereby identical conditions in so far as possible are maintained for each individual and wherein widespread evaluation may be accomplished in a simultaneous manner.

Further, in educating for example, retarded children, it has been found that systems of this type have not been wholly successful in that individual motivational factors cannot be accommodated on a widespread basis. Although the novelty of receiving instructions from a television system has some merit in this regard, it has been determined that further incentive could be provided to the individual student to heighten the interest in the testing program.

Therefore, it is a principal object of this invention to provide an improved television education system wherein a unique reward system geared to the individual student responses is provided.

It is another object of this invention to provide an improved television education system wherein teaching and testing procedures are controlled solely from an originating source and the requirement for having supervisory instructors is obviated.

It is a further object of this invention to provide an improved television education system wherein student responses are graded immediately and a tabulation of responses is provided both at each test location, and at the central source for accumulation of all responses.

It is still another object of this invention to provide an improved television education system having means contained therein to prevent in so far as possible the recording of correct answers by arbitrary guesswork of the individual student.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a pictorial view of the apparatus at a particular test location showing the television receiver and instructor and student consoles;

FIG. 3 is a schematic logic diagram of the circuitry of this system, related in part to the block diagram of FIG. 2;

FIG. 4 is a schematic diagram of the command module of FIG. 2 showing the distribution of signals from the television receiver to a plurality of channels;

FIG. 5 is a schematic logic diagram of the address register of the instant invention;

FIG. 6 is a perspective view of one of the student consoles;

FIG. 7 is a partial cross sectional view of a student console taken approximately along the line 7—7 of FIG. 6; and FIG. 8 is an elevational view of the same student console, partly in cross section showing portions of the dispensing mechanism contained therein.

Figure 2:
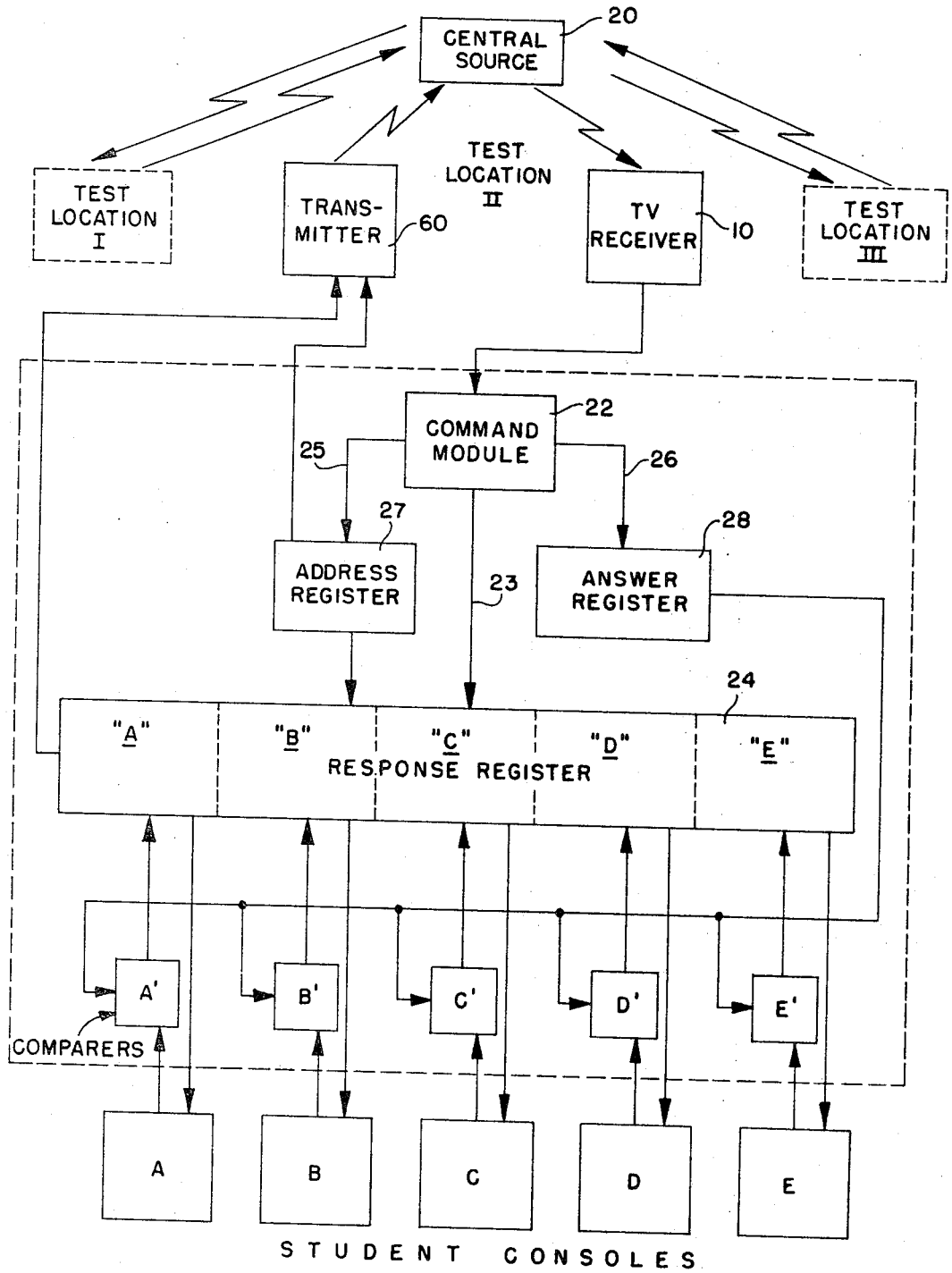
FIG. 2 is a block diagram of the logic of the television teaching system indicating the transmission of signals between and originating source and a plurality of individual student consoles.

Referring now to the FIG. 1 environmental view of the system, there is shown a conventional television receiver 10 which is adapted to receive the standard closed circuit or broadcast signals from a central testing center in a manner well known in the art. For purposes of this description the television receiver 10 will be considered to be located in one classroom of a particular school and it will be understood that there may be a plurality of such receivers and testing systems within the teachings of this invention in any number of other rooms or other locations. All such receivers are linked to the central source to simultaneously receive identical instructional signals. Located at the front of the receiver 10 is the screen 12 of a conventional cathode ray tube which provides the visual embodiment of the transmitted signals, and the receiver 10 further includes a baffle 13 behind which a loud speaker is located for presentation of the audio portion of the signal.

In the usual manner of presentation of testing programs, it is contemplated that the screen 12 of the receiver 10 will be divided into discrete areas in one of which 14 a problem or situation will be presented and in another 15, for example, multiple choice answers may be also simultaneously presented. For purposes of this description a simple matching test is shown on the screen 12 of the receiver 10 having four possible answers provided therewith. However, this system is advantageous in allowing alternative expressions for the presentation of problems. Thus, a scenario may be presented on the problem portion 14 of the screen 12, this being accommodated easily by conventional motion picture techniques at the central source and multiple choice answers may be provided simultaneously therewith or immediately thereafter. Additionally, the system may employ the combination of audio information as well or this may be provided independently including an audio presentation of the multiple choice answers.

Whatever the mode of transmission of teaching or testing signals, also included therewith are correct solutions to the problems and it is one object of this invention to convert these solutions to a utilizable form for comparison with student responses and for an indication of correct results either in the classroom or for transmission to the central source. For this purpose, an instructor console 18 and transmitter 19 are shown connected in the system, portions of the console 18 being adapted to receive pulse type signals from the receiver 10 and to convert the signals to a particular code which will correspond to one of the correct solutions provided either by visual or audio means. It is contemplated in this system that since student responses are transmitted rapidly to the central source, a single programmer at that location may be able to monitor such accumulated response and vary the frequency of presentation of problems and the like.

Five consoles A–E for example, are provided for the students in the teaching program and these include provision for selecting one of a plurality of possible responses and for actuating a dispensing mechanism to reward the student for a correct response. Each of the consoles A–E is independently connected to the instructor console 18, which in turn includes a registering system for recording both the correct and incorrect responses.

Referring now to FIGS. 2 and 3, there are shown combined logic and electrical schematic diagrams of portions of the complete system. FIG. 3 relates primarily to the configuration of the instructor console 18 which receives the teaching information from the television receiver 10, provides a register for the individual student responses, effects a comparison for correct answers and provides a convenient source for read-out of the accumulated responses for transmission to the originating source.

FIG. 2 depicts the overall information flow within the system. Thus programs originating at the central source 20 are beamed to any number of test locations for receipt by a television set 10, for example, at Test Location II, described in detail herein. The programs include not only the test and answer information, but also director information for controlling the recording of student responses and the transmission of same back to the central source 20. As pointed out previously, the test portions of the program are displayed in video or audio form at the television receiver 10, and the remainder of the information provided during the program is directed to the instructor console 18.

A command module 22 located in the console 18 is connected directly to the receiver 10 and receives pulse information from the central source 20, for distribution to various portions of the system. In this embodiment of the invention the command module 22 comprises a multi-channel filter, connected to receive the audio carrier signal within the receiver 10. Various tones are superimposed on the carrier at the central source 20, and the tones are pulse modulated to supply serial binary-coded information. Each channel of the multi-channel filter is responsive to a different tone and provides a separation of the signals for distribution within the system.

Alternatively, such information signals could be received directly from the video portion of the program and the command module could comprise a plurality of photocells adjacent the screen 12 of the receiver 10 at preselected positions. The video signal would then be modified to provide areas on the screen 12 where light and dark fluctuations would actuate the photocells to provide binary information in electrical pulse form.

The serial pulse signals derived in the command module 22 include an interrogate signal which is a train of pulses, an address signal corresponding to the particular test location, answer signals for each problem presented and several reset signals for preparing the various components of the system for each problem. The interrogate signals are directed via line 23 to a response register 24, and the address and answer signals via lines 25, 26 to address register 27 and answer register 28, respectively.

Comparer modules A'–E' corresponding to the student consoles A–E are connected to receive information from the consoles A–E and from the answer register 28 via line 30 and provide outputs to the appropriate portions A"–E" of the response register 24.

The instructor console 18 is provided primarily for the convenience of the teacher in charge of a particular testing location. Since provision is made for registering individual student responses, the teacher may observe the receptiveness of each student to the program and may initiate corrective measures, if necessary. It will become apparent to those skilled in the art that many variations are possible in this system in that control over the testing program may be allocated in part to the instructor for a test location. However, in the preferred embodiment of this invention, the instructor need only perform the role of an observer since the system is completely automatic under control of the central source 20. This leaves the instructor free to attend to corrective duties or to provide other functions in interpreting and recording the responses of that particular class.

The instructor console 18 consists of several components, these including the response register 24 which performs the combined function of recording individual student response and providing a read-out apparatus; the answer register 28 which records the correct answer as provided by the central source 20 for each portion of the testing program; and the comparers A'–E' which effect a comparison of the correct answer with the student response to determine when a reward should be provided to the student.

As seen in FIG. 3, the response register 24 of the instructor console 18 consists of a plurality of flip flop components 31–40 and interconnecting gating circuitry connected in a conventional shift register configuration. A total of ten flip flops 31–40 are shown and these further are grouped into pairs which provide storage registers A"–E" for five student responses. Such number of storage registers A"–E" is taken merely by way of an example and it is clear that any number of students can be accommodated in this type of system, merely by extending or decreasing the capacity of the response register 24. For purposes of this description only one student storage register A" will be described in detail since all operate identically and receive common information from the central source 20. Further, the following terminology will be used throughout this description in relation to the flip flop and gating system which are of the discrete type comprising transistors and diode gates. It is obvious that such a system is capable of embodiment also in an integrated circuit form, for example, wherein similar techniques would be utilized. The conventional symbol for a flip flop as at 31 is employed and it will be assumed that controlling signals for changing the state of the flip flop may be applied at the set 43 or reset 44 inputs thereof or at a common central connection 45 in the conventional manner. Output signals whether they are a DC level or a pulse are derived from either side of the flip flop, depending on the desired condition and are indicated by lines 46, 47 emanating from the flip flop perpendicularly to the set and reset lines 43, 44. Conventional "and" and "or" gates are shown as half circles with either a dot or a plus sign therein respectively, and operate in the well known manner requiring an appropriate combination of inputs to provide a desired output signal. In most instances within the description, an "and" gate will be considered as being in an "on" condition when the side of the flip flop to which it is connected is conducting. Flip flops will be described as being either in a 0 or 1 condition, the 1 condition usually being associated with conduction at the "set" side.

A pair of indicator lights 48, 49 are provided for each student register A" within the response register 24 and provide a visual output to aid the instructor interpreting the response of the students at a convenient location. The indicator lights 48, 49 are connected to the set sides of the pair of flip flops 31, 32 in such a manner that a lit indication will be provided when the respective flip flop has been triggered into its 1 state. This form of read-out provides four possible conditions of student response and in the complete system such information will be relayed back to the central source 20 for appropriate interpretation. Thus, if neither of the indicator lights 48, 49 have been turned on, (i.e., flip flops 31, 32 in 00 code) it will indicate that no response has been received from the student to a particular question of the testing program. If the code 10 is registered, this will indicate a correct response from the student. If the code 01 is registered, it will indicate an incorrect response and if the code 11 is registered, it will indicate a plural response from the student. The latter condition is an indication of a guess and as will be pointed out later, will be registered as an incorrect answer to the problem negating any reward. Such information is useful, however, in indicating that a response has been made by the student and provides a measure of the interest level or activity of response on a group basis.

The configuration of the response register comprises a plurality of flip flops 31-40 in a shift register connection. Interrogate pulses from line 23 of the command module 22 act as shift pulses and are applied at input 50 through gate 51 to a common line 52. Carry pulse gates 55 are interposed between the flip flops 31-40, connected between the outputs 46, 47 of the preceding flip flop and the set and reset inputs 56, 57 of the succeeding flip flop, and so on, to carry information through the register 24, the gates 55 being conditioned for transmission of pulses by conduction of the appropriate side of the respective flip flops 31-39. The second input of each carry pulse gate 55 is connected to the common line 52 to receive the interrogate pulses.

Thus, for example, if flip flop 31 is in the 0 state, gate 55, connected to output 46, will be conditioned to allow an interrogate pulse on line 52 to be applied to the reset input 56 of flip flop 32, thereby triggering flip flop 32 to the 0 state. If flip flop 31 were in the 1 state, gate 55 connected to output 47 would be conditioned instead, to allow application of an interrogate pulse at set input 57 of flip flop 32, triggering it to the 1 state. It is seen then that information in the register is shifted to the right as viewed in FIG. 2 so that each succeeding flip flop attains the state of the preceding flip flop, and the last flip flop 40 will sequentially display all of the information in the register 24 upon the application of a sequence of interrogate pulses. The output of the last flip flop appears at terminal 59 and this signal is applied to the transmitter 60 to pulse-modulate the carrier for relay of the information to the central source 20.

The interrogate pulses are supplied from the central source 20 so that synchronization between the central source 20 and a particular test location is readily accommodated. With diode-transistor logic components in the response register 24, shifting of the information or interrogation may be accomplished in a fraction of a second, with interrogate pulses being applied at a high frequency. Thus, all test locations in a teaching system may be interrogated or sampled in a very short time and results will be practically immediately available at the central source 20 for any appropriate interpretation.

Interrogation of each test location may be repeated any number of times and it is a feature of this invention that multiple interrogations will supply general information as to the time required to receive responses from the individual students, which can be used as a guide for supplying the next problem in the program and may be interpreted to evaluate receptiveness of the program or achievement by the students.

In this last regard, it should be noted that in operation of the response register 24, the first interrogate pulse on line 52 will be applied directly to reset input 44 of flip flop 31 to change its state to 0. Due to the shift feature during interrogation, eventually all flip flops 31-40 will be changed to the 0 state which provides an automatic reset for the register 24 and which may be recognized at the central source 20 as the completion of interrogation of that particular test location.

The set inputs 43 of each of the flip flops 31-40 in the register 24 receive student response information from the comparer portion A'-E' of the circuitry and are effective to set the respective flip flops 31-40 to the 1 state. A reward gate 62 is connected as shown to output 47 of flip flop 31 and output 63 of flip flop 32 to be responsive to the 10 condition of the individual student register A" and to provide an output on line 64 to change the state of the reward flip flop 65. The output of the reward flip flop 65 is connected to the appropriate student console A and provides a control for the dispensing of a reward token to the student upon the attainment of a correct answer.

In normal operation, the response register 24 receives control signals from the address register 27 at inputs 68, 69. Input 68 turns off gate 51 and prevents interrogation pulses on line 52. Input 69, connected to gates 70, 71, in student register A" and corresponding gates in the remaining student registers B"-E", conditions gates 70, 71 for transmission of signals.

Student responses are then recorded in the register 24 during the transmission of a problem of the program, by way of gates 70, 71 receiving answers on lines 72, 73 from comparer A'. When it is desired that a sampling be made of the response register 24 at a particular test location, as determined at the central source, an appropriate address code will be transmitted identifying that test location and preparing the register 24 for read-out. This is recognized in the address register 27 and its effective to change the energizing conditions at inputs 68, 69. The shift pulse gates 55 will be activated and gates 70, 71 will be biased off to prevent student response information from reaching the register 24 during interrogation. Upon completion of the sampling interval, a reset pulse will be applied to the address register 27 to again change the states of the inputs 68, 69 and the student response information from the comparator A' will be effective again to set the flip flops 31-40 in the response register 24.

Although a rather complex sequence of operations has been presented in the interrogation interval, it will be appreciated that such interval is very short and that all test locations in a particular television system arrangement can be sampled rather quickly. Further, since the interrogation interval is so short, interruption of the visual output of the response register 24 at indicator lights 48, 49 will be only momentary and the register 24 will be returned to its normally responsive state to provide useful information for the instructor.

The address register 27 of the system comprises a binary counter consisting for purposes of this disclosure of five flip flops 80-84 connected in the conventional manner to provide a register for the count provided from the central source 20. Input pulses are received from the command module 22 on line 25 and are applied at input 85 to the center connection of the first flip flop 80 of the register 27. On alternate input pulses a carry pulse is generated in the conventional manner to be applied to the center connections of the succeeding flip flops 81–84. The register 27 shown in this embodiment has a capacity of 32 counts, and some number within this range will correspond to the address of this particular test location. The code 11010 has been selected as representative and corresponds to an input count of eleven pulses. When such number of pulses is transmitted from the central source 20 on the address channel, they will appear on line 25 to actuate the address register 27. Such information is required to interrogate the representation stored in the response register 24 for transmission to the central source 20 for recording there and for evaluation. Thus, immediately following the address signal a specified number of interrogation pulses will be applied to the response register 24 at input 50 to cause a read-out thereof.

The number stored in the address register is decoded by a simple "and" gate array which requires a particular pattern of conduction of the flip flops 80–84 in the code 11010 to energize all of the gates. Four gates 86–89 are used at any test location for recognition of the address and at the location described consist of gate 86 connected to the 11 outputs of flip flops 80, 81; gate 87 connected to the 01 outputs of flip flops 82, 83 respectively; gate 88 connected to the 0 output of flip flop 84 and the output of gate 87; and gate 89 connected to the outputs of gates 86, 88. The output of gate 89 is applied to the set input of address flip flop 90 which in turn has mutually exclusive outputs 91, 92. The outputs 91, 92 are connected to inputs 68, 69 respectively of the response register 24 and it will be remembered, condition the response register 24 for receipt of student responses or for the interrogation cycle. It is seen that only the particular code 11010 will cause an output from gate 89 to actuate the address flip flop 90 to the set state. A reset signal received at terminal 94 from the command module 22 is effective to reset the address flip flop 90 at the completion of the interrogation sequence, and the same signal is applied at terminal 95 to reset all of the flip flops 80–84 in the address register.

The instructor console 18 further includes an answer register 28 which comprises two flip flops 100, 101 in a counter configuration having a capacity of four counts. A corresponding gate array 102 provides the decoding function. The four count capacity corresponds to the four possible solutions provided at the screen 12 of the television receiver 10 and any one of the solutions may be selected by the appropriate count. Only a single answer register 28 is required for each test location and four output lines 104–107 are provided which are utilized for control of each of the student registers A″–E″ in the response register 24. Inverter amplifiers indicated at 109 are connected to each of these output lines 104–107 to provide reciprocal signal output lines 110–113, and similarly, these are presented in common to the remainder of the circuitry. It will be appreciated that the four count counter is merely exemplary and any number of counts may be accommodated in this teaching system, requiring only additional flip flops and corresponding decoding circuitry. The pulse input signals are received concurrently with the problem at terminal 103 from the appropriate channel of the command module 22 via line 26, and a signal for resetting the flip flops 100, 101 to the 00 state is similarly received at terminal 108 prior to presentation of the next problem in the program.

Four push button switches 115–118 are provided in student console A for the selection of the appropriate answer and these switches are connected by way of a cable 124 to input terminals 120–123 respectively at the instructor console 18.

Further, comparer circuits A′–E′ are included in the instructor console 18 for comparing the responses of the students with the correct answer provided from the central source 20. As pointed out previously, provision is made for recording not only the correct answer but also any response or non-response of the student including plural responses. A first group of four "and" gates 125, each of which is connected to receive an input from the student console at terminals 120–123, and the correct answer from the answer register decoder 102, have outputs connected to a common "or" gate 126 to provide a correct response signal on output line 72. A similar four "and" gate array 127 is connected to receive signals from the student console A at the same terminals 120–123 and the inverted outputs on lines 110–113 of the answer register decoder 102. The outputs of the "and" gates 127 are connected to "or" gate 128 to provide an incorrect response indication on output line 73.

Thus, for example, if the code 01 is stored in the answer register 28, with flip flop 100 in the reset state and flip flop 101 in the set state, the gate in the decoding group 102 providing an output on line 105 will be energized to condition the corresponding gate in the comparer array 125. Because of the inverter amplifiers 109, non-outputs on lines 104, 106, 107 will be converted to energize lines 110, 112, 113 and conditioning signals will be provided to the corresponding gates of the incorrect response comparer gate array 127. If a correct answer is selected by the student by depressing switch 116 to provide a signal at terminal 121, the conditioned gate in the array 125 will be actuated to provide an output signal on line 72. If any other switch 115, 117, 118 is selected, one of the conditioned gates of the array 127 will be actuated to provide an incorrect response output signal on line 73. Such output signals on lines 72, 73 are connected through further "and" gates 70, 71 under control of the address flip flop 90, being conditioned in the normal operating mode, to set the respective flip flops 31, 32 in the response register 24 to the on condition.

It will be clear that if a correct answer is selected first by the student, flip flops 31, 32 will register a 10 code and gate 62 will recognize the condition to provide a pulse output on line 64. The reward flip flop 65 will be set to provide an output signal at terminal 130, which in turn is connected to student console A, via cable 124 for energization of the reward token dispensing mechanism. However, if an incorrect response on line 73 is received first, flip flop 32 will be set to the 1 state and it will be impossible to actuate the reward flip flop 65.

A time delay module 132 is connected in series with the line between the input of gate 62 and the output 47 of flip flop 31 to provide a momentary delay to the signal applied to gate 62, and thus to the triggering of the reward mechanism. The delay provided by the module 132 need only be on the order of one second and is effective to prevent most instances of guessing on the part of the student. Thus, if correct and incorrect answer switches of the student console switches 115–118 are actuated simultaneously, the time delay will prevent a momentary registration of the code 10 in the flip flops 31, 32, due to inherent switching time characteristics of the components, from actuating the reward flip flop 65. Even if the student randomly and sequentially actuates the switches 115–118, a correct response followed by an incorrect response within such interval provided by the time delay 132, will be prevented from actuating the reward flip flop 65. Of course, the time delay may be varied from the preferred interval of one second to accommodate longer intervals between multiple student responses, the only minor drawback being a corresponding delay in the actuation of the reward mechanism when only a correct response is received. In this latter regard, it is entirely feasible to alter the circuitry slightly to respond to a reward signal transmitted from the central source 20 at any desired time. Such scheme of operation would avoid "false" rewards also, since only the student registers recording the proper code 10 at that instant would provide a reward. The reward flip flop 65 is reset prior to presentation of the next problem by a pulse received from the command module at terminal 135.

As a further refinement of the teaching system the instructor console 18 is provided with a group of four indicator lights shown generally at 137 in FIG. 1 which may be connected to each of the outputs of the flip flops 100, 101 in the answer register. The lights 137 thus display the answer provided by the central source 20 and may be viewed by the instructor as a check for the correct solution to each particular problem. A totalizing counter 138 may also be included in the instructor console 18, to be responsive to the interrogate output 59 of the response register 24 as it is read out, and to provide an accumulation of the total correct responses of the student group as an aid for the instructor.

As was pointed out previously, this teaching system may be controlled at each particular test location rather than from the central source 20 as a simplification of the system. In this mode of operation, received signals may be displayed at the television receiver 10 or a "flashcard" system might be employed with electronic registration of responses and the dispensation of reward tokens in the manner described previously. For this purpose, manual answer selection 139 and reset 142 push buttons are provided at the instructor console 18 for locally generating control signals. Thus, the answer push button 139 may be actuated to record a correct answer in the register 28, the indicator lights 137 providing the indication, and after student responses have been displayed by the indicator lights as at 48, 49, the reset push button 142 may be actuated to prepare the system for the next problem. In this mode of operation, of course, it will not be necessary to transmit information back to the central source 20 and the transmitter 19 may be deactivated by suitable control switches.

Referring now to FIGS. 6, 7 and 8, there are shown perspective, cross sectional and cut-away views of one of the student consoles A–E which are provided for the students in the testing program. Console A, as exemplary, consists of a generally rectangular housing 140 having a sloping panel 141 in the lower forward section thereof and includes the four push buttons 115–118 mounted thereon, corresponding to the four possible solutions to the problems presented in the program. As has been pointed out previously, such embodiment is merely representative and either a greater or lesser number of solutions could be accommodated by a corresponding number of push buttons, circuitry and associated mechanism. Immediately below each of the push buttons 115–118 are trays 143–146 which serve as receptacles for the reward tokens, dispensed upon selection of a correct answer. Indicator lights 147–150 are mounted in the sloping panel 147 directly above the push buttons 115–118 to provide a visual signal of the answer selected and to act as some stimulus to the student.

A central token container 152 consisting of a tube 153 angularly mounted in the housing, is provided for storing a plurality of reward tokens 154. The upper end of the token container 152 is exposed to the exterior of the housing 140 so that tokens may be conveniently dropped into the container for replenishment of the supply. The token container 152 communicates with a distribution chute 155 which is transversely and angularly disposed in the housing in a manner such that when a token is dropped on the upper end of the distribution chute 155, the token will slide or roll under the influence of gravity to a series of four vertical chutes 156–159 which communicate with upwardly angled extensions 143a–146a of the trays 143–146. A dispenser mechanism 160 retains the tokens 154 in the container 152 and upon a signal from the reward flip flop 65 of the response register 24, will allow a single token to be dropped into the distribution chute 155 to be deposited into the appropriate one of the trays 143–146. Selection of a particular vertical chute in this embodiment is achieved by a mechanical linkage with the particular push button selected by the student.

The dispensing mechanism 160 consists of a pair of plates 161, 162 mounted in spaced overlapping relation to one another and retractably mounted in intersecting relation to the token container 152 near the lower end thereof. The plates 161, 162 are coupled for movement in unison with the plunger 164 of the dispensing solenoid 165 and in FIG. 7 are shown in the normal retracted state. The lower plate 162 has an aperture 166 in the outer portion thereof through which a token is dispensed and the inner portion of the plate 162, in the normal position, extends through the container 152 to support the tokens 154 thereon. The upper plate 161 which is of a length to overlap only the apertured portion of the lower plate 162, has an angled forward edge 167 which facilitates insertion between the lowermost pair of tokens 168, 169 in the container 152. Thus, when the dispensing solenoid 165 is actuated by a signal from the reward flip flop 65, the overlapping plates 161, 162 will be urged upwardly as viewed in FIG. 7. The upper plate 161 will enter between the lower pair of tokens 168, 169 in the container to prevent dispensing more than one token. The lower plate 162 will be moved simultaneously so that the aperture 166 therein allows the separated token 168 to drop through into the distribution chute 155. The dispensing solenoid 165 will remain in the actuated state until the reward flip flop 65 in the response register 24 is reset whereupon the overlapping plates 161, 162 will be returned to their normal retracted position. In this position the stack of tokens 154 will then drop in the container 152 to rest against the lower plate 162 in preparation for another dispensing cycle.

Push button 115 is affixed to the upper end of a rod 170, slidably mounted in a bearing block 171. A bias spring 172 is located in a counterbore in the block 171 for urging the push button 115 and thus the rod 170 to the outermost position and for returning the dispensing mechanism to the closed position. As seen in FIGS. 7 and 8, push button 115 is shown in the actuated position and spring 172 is compressed. A bell crank 174 is pivotally mounted on a rod 175 extending transversely within the housing 140 and the bell crank 174 is pivotally adjoined at one leg with the push button rod 170 and at the other leg with a clevis link 176 by means of pin and slot arrangements in both instances. The clevis 176 in turn is coupled by a pin and slot connection to one end of a cover member 177 for the vertical chute 156. The cover member 177 is pivotally mounted near the entrance to the chute 156 to form in the closed position, a continuation of the lower surface of the distribution chute 155, and in the open position an abutment for deflection of a token into the vertical chute 156.

Thus, as push button 115 is depressed, partial rotation of the bell crank 174 will occur in the counter clockwise direction as view in FIG. 7 to draw the clevis link 176 downwardly and to rotate the cover member 177 in a counter clockwise direction as viewed in FIG. 8, to the open position.

A detent mechanism 180 is provided for retaining the push button 115 in the depressed position and consists of a pin 181 mounted for limited sliding movement in a plate 182 extending transversely of the housing 140 and including a spring 183 for biasing the pin 181 in the downward direction. A notch 184 in the lower end of the push button rod 170 is engaged by the pin 181 when the push button is depressed and serves to prevent the return of the rod 170 by spring 172. The transverse plate 182 is pivotally mounted at one side of the housing in bracket 186 and is coupled to the plunger 187 of the reset solenoid 188 at the other side. Upon actuation of the reset solenoid 188, the transverse plate 182 will be drawn in a counter clockwise direction as viewed in FIG. 8 engaging stop pin 189 on the upper end of the slidable pin 181 and withdrawing the pin 181 from the notch 184 in the push button rod 170. The rod 170 now being free to slide will be urged by the spring 172 to the normal outward position causing a return rotation of the bell crank 174 and a closure of the cover member 177.

A cam 190 mounted on the rod 170 and a microswitch 191 mounted on the sloping panel 141 of the housing cooperate to provide an indication of the depressed position of the push button 115. A set of contacts of the microswitch may be connected with a source of power and the indicator light 147 to provide a visual indication of the depressed position of the push button 115. A second set of contacts are connected by way of cable 124 with terminal 120 of the instructor console 18 to provide an electrical indication of the selection of the individual student.

All of the remaining push buttons 116–118 have similar corresponding mechanisms and circuitry for actuating similar cover plates in the distribution chute 155, variations occurring only in the length of linkages, and the like. All, however, are reset simultaneously by solenoid 188 and provide similar information. Thus, when one of the push buttons 115–118 is depressed by the student, the corresponding cover plate in the dispensing mechanism will be pivoted to the open position such that a token dropped into the distribution chute 155 will be deflected into the appropriate vertical chute and eventually to the corresponding tray at the forward edge of the housing 140. Even though a plurality of push buttons 115–118 are depressed and the corresponding cover plates moved to the open position, it will be remembered that the circuitry of this system is effective to recognize such multiple answers and will prevent the actuation of the reward flip flop 65. Thus, no tokens will be dispensed into the distribution chute 155 and no false rewards supplied. Reset of the solenoids 165, 188 in the console A is simultaneous with the reset of the reward flip flop 65 by the signal applied at terminal 135, as pointed out previously.

Thus, an almost immediate reward in the form of a token is supplied to the student upon the selection of a correct answer to the problem presented and such tangible reward is conducive to maintaining the interest of the student in the testing program.

FIG. 1 shows a modification of this system in relation to console B wherein the console incorporates a remote display of the television receiver screen 12. A conventional cathode-ray monitor tube 200 may be interconnected with the television receiver 10 to display simultaneously or alternatively the information at the receiver 10. This may be done by a conventional television monitor arrangement having appropriate power supply and interconnecting circuitry or may take the form of a projection type system wherein the image at the main receiver 10 may be directed to a screen at each individual console. In these arrangements, it is apparent that the answer portion 202 of the monitor screen 200 may be aligned respectively with the push buttons 115–118 and with the trays 143–146 so that the student may associate the proper push button with the appropriate section of answer information.

Further in this regard it will become apparent that many similar modifications are possible in a system of this type and are to be considered as falling within the teachings of this invention. Thus, to further encourage registration of the proper response button with the appropriate answer portion 202 of the monitor screen 200, for example, a clear plastic tab arrangement (not shown) could be adapted in a manner such that the tabs cover the respective answer portions of the screen. The tabs could be pivotally mounted so that upon touching the tab covering the selected answer portion of the screen, the appropriate response button will be depressed also to electrically and/or mechanically register the response.

As has been pointed out previously, the location of the consoles A–E with respect to the main receiver 10 may be varied to some extent. Thus, in order to facilitate registration of the response buttons 115–118 with the answer channels 15 on the screen 12, it might be preferable to locate a console directly in front of the receiver 10 so that the student is aided in making the proper association. Alternatively, such console could be incorporated in the cabinet of the receiver 10 preferably directly below and a few feet forward of the screen 12 such that the student is at a comfortable viewing distance from the screen.

Another variation of the system relates to the interconnection of the student consoles A–E with the response register 18 and the receiver 10. Thus, even though direct wire connections are shown in the preferred embodiment of this system, it is entirely possible that the responses of the student may be formulated not as an electrical signal but perhaps as an audible signal similar to the well-known television remote control devices or even as a light signal, for example, in the form of a laser beam which could be received by compatible registration circuitry.

Further, since correct and incorrect answer information is available in this system, as at the outputs of flip flops 31, 32, it is possible to provide various forms of encouragement to the student in addition to or in place of the token reward. Thus, a pre-recorded message indicating audibly "Fine, that was the correct response" or "No, that's incorrect, try another," for example, could be triggered by the student's response. A tape recorder could be utilized for this application and various foreign languages could be easily accommodated. Such technique would provide encouragement for every response of the student and would undoubtably reinforce the learning process.

Other modes of applying the principles of the invention may be employed, change being made as regards the details described, provided the features stated in any of the following claims or the equivalent of such be employed.

I, therefore, particularly point out and distinctly claim as my invention:

1. Apparatus for a teaching system wherein a program of sequential problems is generated at a central station and is transmitted in the form of electrical signals to at least one local station comprising, at the local station, receiver means responsive to the electrical signals for providing a presentation of the program to a plurality of students, means for registering responses of the students to each problem of the program, means operatively connected to said registering means for comparing student responses with answer information and for providing a reward signal for correct responses, and means operatively connected with said comparing means for dispensing a tangible reward to a student upon receipt of a reward signal.

2. Apparatus as set forth in claim 1 further including a transmitter operatively connected with said student registering means for relaying student response information to the central station for tabulation and evaluation.

3. Apparatus as set forth in claim 1 wherein answer information is included in the transmitted program and further including an answer register operatively connected with said receiver means and said comparing means for providing an electrical representation of the correct answer, said student registering means being operative to provide an electrical representation of student responses, and said comparing means being continuously operative to compare such electrical representations.

4. Apparatus as set forth in claim 3 wherein said receiver means is a television receiver having a screen upon which the program of problems is visually presented to the students, and having conventional circuitry for receiving correct answer and control information with the transmitted signal, and further including means operatively connected with said receiver for distributing such answer and control information to said register means.

5. Apparatus for use in a teaching system wherein program and control information is generated at a central station and transmitted to a television receiver at a local station for video presentation of problems, comprising means coupled to the television receiver for receiving and distributing control and answer signals into different channels, an answer register connected to one channel of said distributing means for storing a digital representation of the solution to a presented problem, a register actuatable by a student for providing an electrical signal representative of the student's response, a comparer connected between said answer register and said student register for comparing the response and answer representations and for providing an output signal upon a correct comparison, and means responsive to the output of said comparer for dispensing a token reward to the student.

6. Apparatus as set forth in claim 5 wherein said comparer provides a second output signal upon an incorrect comparison, indicating a wrong response by the student, and further including means responsive to said output signals for preventing actuation of said dispensing means upon receipt of a second output signal.

7. Apparatus as set forth in claim 6 wherein said preventing means comprises a storage register for recording said output signals and means for sensing the information in said storage register, said sensing means being operative to provide a reward signal when a correct answer output signal is received from said comparing means in the absence of a wrong response second output signal.

8. Apparatus as set forth in claim 7 wherein said preventing means further includes means for delaying actuation of said sensing means for a predetermined interval of time, whereby the occurrence of a second output signal in such interval of time will prevent a reward signal.

9. Apparatus as set forth in claim 7 further including means for reading out the information in said storage register, said reading means being connected to said distributing means and operative in response to an interrogate signal from the central station, and a transmitter coupled to said reading means for relaying the information in said storage register to the central station.

10. Apparatus as set forth in claim 9 wherein said storage register is a shift register, and further including an address register connected to said distributing means for switching said shift register to a readout mode upon receipt of coded signals representative of the local station identification, said shift register thereby being responsive to interrogate pulses from said distributing means to provide a serial representation of information stored therein.

11. Apparatus as set forth in claim 10 wherein said shift register comprises a plurality of stages for simultaneously registering the responses of a plurality of student registering means, said stages being interconnected for sequential readout of information contained therein.

12. Apparatus as set forth in claim 10 wherein said dispensing means and said student registering means are contained in an individual console and comprise a manually operated bank of switches, a storage container for a plurality of tokens and means for dispensing a single token upon receipt of a reward signal from said comparer means, said switches providing an electrical representation of the student response and being operatively connected with said comparer means.

13. Apparatus wherein a program of multiple alternative options is presented in the form of signals to at least one local station comprising, at the local station, receiver means for receiving said signals for providing simultaneous visual and audio presentations of the program to a plurality of respondents, means for providing pre-designated answer information indicating the preferred or correct option of such alternative options, means for registering responsive choices by the respondents, means for providing a reward signal when the responsive choice of a respondent corresponds to the pre-designated correct or preferred option, and means responsive to said reward signal for dispensing a tangible reward to a respondent having made the correct or preferred choice.

14. Apparatus as set forth in claim 13 wherein said dispensing means comprises a bank of manually operable switches, a container for a plurality of tokens, means operable in response to actuation by a respondent of a single switch, representing a correct or preferred choice, for dispensing a single token from said container, and distribution means operatively coupled with said switches for transporting such dispensed token to a region contiguous to said actuated switch.

15. Apparatus as set forth in claim 14 wherein said distribution means comprises a bank of generally vertical chutes associated with said bank of switches, an inclined chute operatively coupled with said bank of chutes and with said container and adapted to guide a dispensed token successively to said vertical chutes, and guide means associated with each said vertical chute and operable by said respective switch for directing the dispensed token into the appropriate vertical chute, said guide means comprising a cover plate for each of said vertical chutes, said cover plate in the closed position forming a portion of the bottom of said guide chute, and being operatively coupled to said respective switch for movement to an open position.

References Cited

UNITED STATES PATENTS

| | | | |
|---|---|---|---|
| 2,855,703 | 10/1958 | Stanton | 35—5X |
| 3,095,653 | 7/1963 | Corrigan | 35—9 |
| 3,246,402 | 4/1966 | Diamond | 35—9 |

WILLIAM H. GRIEB, Primary Examiner

U.S. Cl. X.R.

178—5.6